United States Patent
Desai et al.

(10) Patent No.: US 9,522,628 B2
(45) Date of Patent: Dec. 20, 2016

(54) HEADLIGHT ASSEMBLY WITH STATIC BENDING LIGHTS

(71) Applicant: Ford Global Technologies, LLC, Dearborn, MI (US)

(72) Inventors: Ketan K. Desai, Farmington Hills, MI (US); Li Yan, Troy, MI (US); David A. Brown, West Bloomfield, MI (US); Stephen Kenneth Helwig, Farmington Hills, MI (US); Sleiman N. Abdelnour, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 34 days.

(21) Appl. No.: 14/282,052

(22) Filed: May 20, 2014

(65) Prior Publication Data

US 2015/0336501 A1    Nov. 26, 2015

(51) Int. Cl.
*B60Q 1/12* (2006.01)
*F21S 8/10* (2006.01)
*B60Q 1/00* (2006.01)

(52) U.S. Cl.
CPC .............. *B60Q 1/12* (2013.01); *B60Q 1/0041* (2013.01); *F21S 48/125* (2013.01); *F21S 48/1317* (2013.01); *B60Q 2300/112* (2013.01); *B60Q 2300/12* (2013.01); *B60Q 2300/122* (2013.01); *B60Q 2300/142* (2013.01)

(58) Field of Classification Search
CPC .... B60Q 1/12; B60Q 2300/12; F21S 48/1317; F21S 48/125; F21S 48/1352; F21S 48/1159; F21S 48/1388; F21S 48/142; F21S 48/17; F21S 48/1768

USPC .......................................... 362/543–546, 548
See application file for complete search history.

(56) References Cited

U.S. PATENT DOCUMENTS

| | | | |
|---|---|---|---|
| 7,390,112 B2 | 6/2008 | Leleve | |
| 7,540,638 B2 | 6/2009 | Dassanayake et al. | |
| 8,217,306 B2 | 7/2012 | Inoue et al. | |
| 2003/0156420 A1* | 8/2003 | Tatsukawa | B60Q 1/12 362/465 |
| 2003/0174493 A1* | 9/2003 | Kinouchi | B60Q 1/12 362/43 |
| 2005/0018436 A1* | 1/2005 | Leleve | B60Q 1/12 362/464 |
| 2007/0268713 A1* | 11/2007 | Chinniah | F21S 48/1329 362/507 |

(Continued)

FOREIGN PATENT DOCUMENTS

| | | |
|---|---|---|
| CN | 1955044 A | 5/2007 |
| DE | 10300771 A1 | 5/2004 |

(Continued)

*Primary Examiner* — Anh Mai
*Assistant Examiner* — Matthew Peerce
(74) *Attorney, Agent, or Firm* — Jason Rogers; Brooks Kushman P.C.

(57) ABSTRACT

A headlight assembly including an upper static bending light and a lower static bending light. The upper and lower static bending lights are provided on an inner wall of a headlight assembly that defines an opening. The inner wall of the assembly is inboard of the high-beam headlights. The upper and lower static bending lights are controlled by a controller that responds to inputs corresponding to the speed of the vehicle, angle of the steering wheel, and actuation of a turn signal actuator.

15 Claims, 3 Drawing Sheets

(56) References Cited

U.S. PATENT DOCUMENTS

2014/0185307 A1* 7/2014 Lee .................... F21S 48/1747
362/465

FOREIGN PATENT DOCUMENTS

JP 2008074327 A 4/2008
KR 100798143 B1 1/2008

* cited by examiner

HEADLIGHT ASSEMBLY WITH STATIC BENDING LIGHTS

TECHNICAL FIELD

This disclosure relates to headlights for a vehicle that include a static bending lighting element for selectively illuminating areas to one side of the vehicle at low speeds when the steering wheel is turned to steer the vehicle toward the one side.

BACKGROUND

The term "static bending light" refers to a lighting system for vehicle lamps, or headlights, that are intended to eliminate blind spots for a driver when making a turn. Static bending lights provide illumination for areas that were previously blind spots when making turns and provide greater visibility utilizing a light that does not have any moving parts. Static bending lights project light toward the side of the vehicle in the direction the driver is turning the steering wheel and allows a driver to easily detect the presence of pedestrians, other vehicles, or obstacles in front/side blind spots.

A static bending lighting system has been developed that includes a single lighting element between the high and low beam headlights that is illuminated when the steering wheel is turned in a range of between 25° and 35° depending upon driving speed. This system is limited to providing one light projection pattern and may illuminate too wide of and area or too narrow of an area under some conditions.

Another approach disclosed in U.S. Pat. No. 7,390,112 is to provide several LED lights in an arcuate array that are switched on progressively based upon an input from a steering wheel position sensor. The array of lights is assembled to the outside of the headlights of the vehicle with four lights being illustrated in the array. The innermost light is switched on first followed by the other lights sequentially as the degree of steering wheel turning increases. As each additional light is illuminated, the previously illuminated lights remain illuminated until the steering wheel is turned back to a straight path.

Advances over the above approaches for providing a static bending light system are summarized below.

SUMMARY

This disclosure is directed to providing a static bending light that has improved aesthetics because it is less visible to outside observers and that has an enhanced projection pattern that is responsive to selected steering wheel angle ranges, sensed vehicle speed levels, and actuation of the turning signal actuator.

According to one aspect of this disclosure, a headlight assembly is provided on a first side of a vehicle that includes at least one low beam headlight and at least one high beam headlight. A housing has an inboard wall that defines an opening and is disposed between a longitudinal center of the vehicle and the high beam headlight. A static bending light is provided on the inboard wall facing the first side that selectively illuminates a first side area through the opening.

According to other aspects of this disclosure, the static bending light may further comprise upper and lower light sources and upper and lower reflector assemblies. The upper light source and lower light source may be independently controlled to illuminate different portions the first side area. The upper light source may be used to illuminate a forward portion of the first side area adjacent an area illuminated by the low beam headlight. The lower light source may be used to illuminate a lateral portion of the first side area adjacent the forward portion on an opposite side of forward portion from the area illuminated by the low beam headlight.

The headlight assembly may further comprise a turn signal actuator, a speed sensor, a steering direction sensor, and a controller. The controller may receive a signal from the turn signal actuator when actuated, the speed sensor when a sensed vehicle speed is within a defined range, and from the steering direction sensor when the vehicle is turned within a defined range toward the first side. The upper light source and lower light source may be actuated independently to illuminate different portions of a first side area. The steering direction sensor is a steering wheel position sensor.

According to another aspect of this disclosure, a static bending light module for a headlight assembly of a vehicle is provided that includes a wall that extends longitudinally and defines a lens opening. An upper light source and reflector assembly may be secured to the wall. A lower light source and reflector assembly may be secured to the wall below the upper light source. The upper light source and lower light source may be selectively actuated to project light toward a first side area through the lens opening.

According to another aspect of this disclosure, a headlight assembly is provided for a vehicle that comprises a housing having an inboard wall that defines a lens opening and is disposed between a longitudinal center of the vehicle and at least one high-beam module of the headlight assembly. The inboard wall faces a first side of the vehicle. A plurality of low-beam modules and the high-beam module attached to the housing. A static bending light is provided on the inboard wall that selectively illuminates a first side area through the lens opening.

The above aspects of this disclosure and other aspects are described in detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
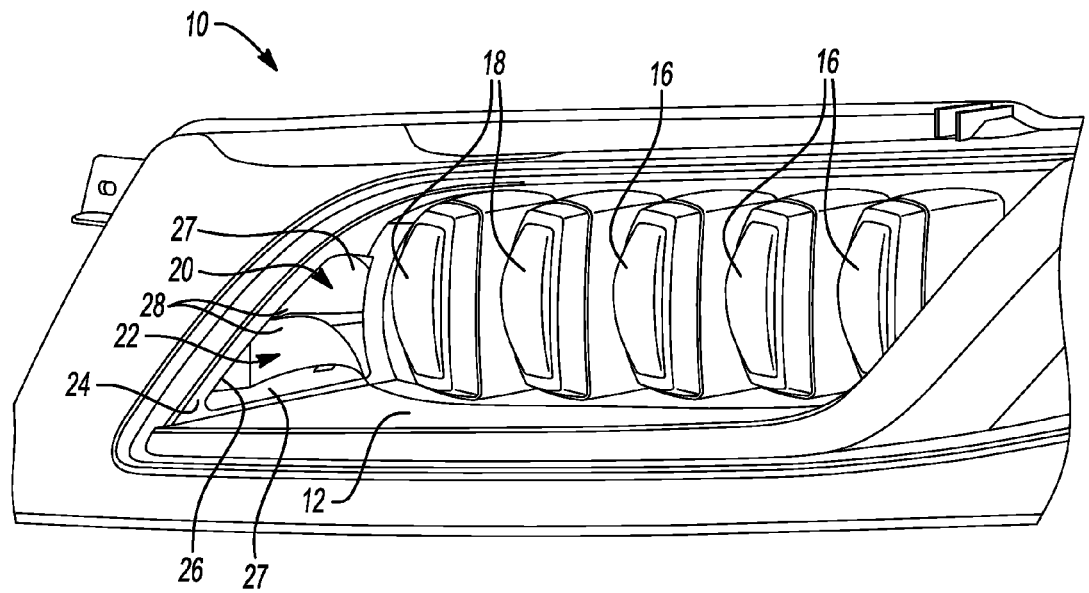
FIG. 1 is a left/front perspective view of a headlight assembly including low beam and high beam headlights and a static bending light system made according to one embodiment of this disclosure.

Referring to FIG. 1, a headlight assembly 10 is illustrated that is contained within a housing 12 and includes three low-beam headlights 16 and two high-beam headlights 18. An upper static bending light 20 is shown disposed above a lower static bending light 22 at a location that is inboard of both the high-beam headlights 18 and the low-beam headlights 16. The static bending lights 20, 22 are assembled to an inside wall 24 of the headlight assembly 10. The inside wall 24 defines an opening 26 through which both the upper static bending light 20 and the lower static bending light 22 are configured to project light. The opening 26 includes at least one lens 27, but preferably includes two lenses 27 that focus the light projected by the static bending lights 20, 22. One lens 27 is provided for the upper static bending light 20 and another lens 27 is provided for the lower static bending light 22. Alternatively, the static bending lights 20, 22 may be directed by reflectors 28 to the desired light projection area.

Figure 2:
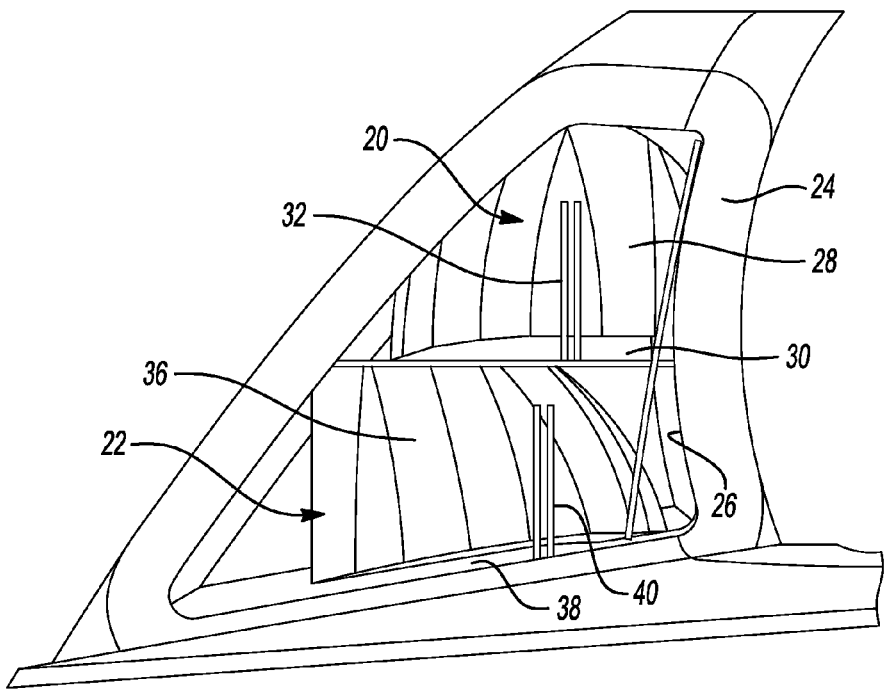
FIG. 2 is a side perspective view of the static bending light system shown in FIG. 1.

Referring to FIG. 2, the upper static bending light 20 and lower static bending light 22 are shown removed from the housing for better visibility. The upper static bending light 20 includes an upper reflector 28 that is disposed above an upper reflective platform 30. An upper light emitting diode (LED) light source 32 is assembled to the upper reflective platform 30 to project a beam of light upwardly to the upper reflector 28. Light reflects between the upper reflector 28 and the upper reflective platform 30 until it is projected through the lens 27 (shown in FIG. 1) in the opening 26 in the inside wall 24. The pattern of the light projected by the upper static bending light 20 is described below with reference to FIGS. 4-6.

The lower static bending light 22 is shown to include a lower reflector 36 and a lower reflective platform 38. The lower reflector 36 is disposed between the upper reflective platform 30 and the lower reflective platform 38. A lower LED light source 40 is assembled to the lower reflective platform 38 to project a beam of light towards the lower reflector 36. Light is reflected between the lower reflector 36 and the lower reflective platform 38 until it is projected as a beam through the lens 27 (shown in FIG. 1) in the opening 26 defined by the inside wall 24.

Figure 3:
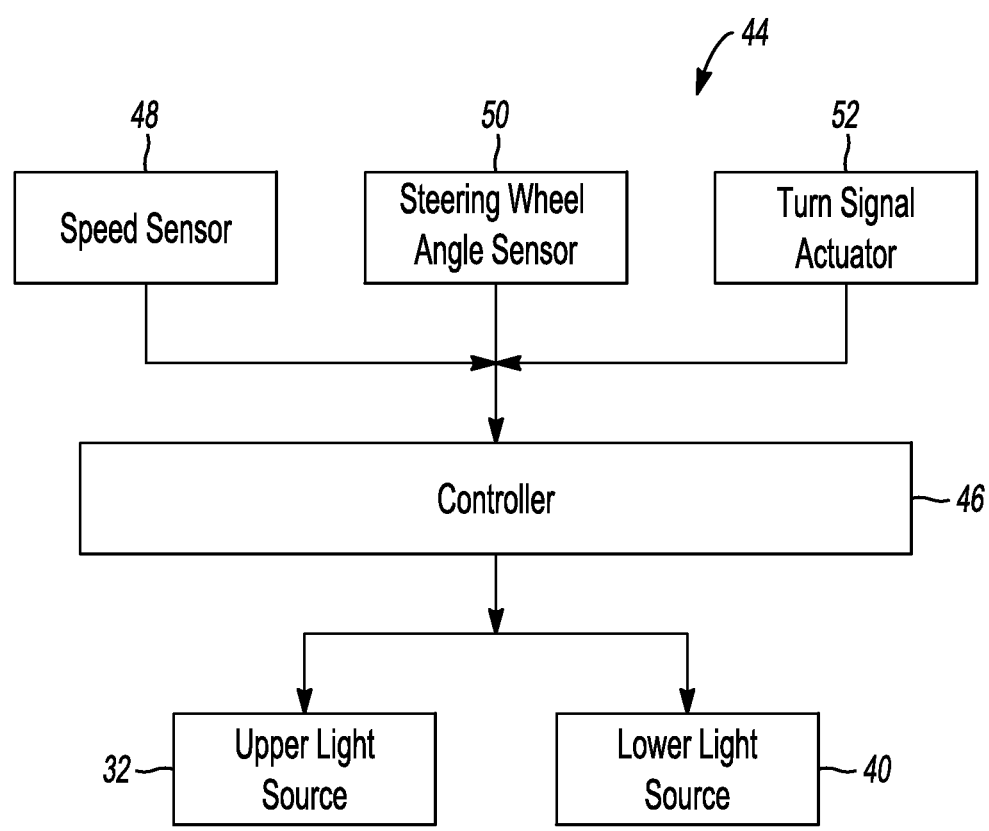
FIG. 3 is a flowchart of the control system for the static bending light system.

Referring to FIG. 3, a control system diagram 44 is provided to describe the inputs and outputs of a controller 46. The controller 46 may be part of a larger control system or may be a dedicated controller that controls the headlight assembly 10.

A speed sensor 48 senses the speed of a vehicle that includes the headlight assembly 10. The speed sensor 48 may be an accelerometer, a transmission mounted sensor, or a signal corresponding to the vehicle speed that is obtained from the vehicle CAN bus.

A steering wheel angle sensor 50 provides an input to the controller 46 corresponding to the number of degrees of rotation of the steering wheel, either left or right, relative to a straight path vehicle direction.

A turn signal actuator 52 provides an input to the controller 46 when the turn signal indicator lever is actuated by a driver to indicate that a turn is planned by the driver.

The controller 46 utilizes the inputs from the speed sensor 48, steering wheel angle sensor 50 and turn signal actuator 52 to control illumination of the upper light source 32 and the lower light source 40.

For example, when the turn signal actuator 52 is actuated and the steering wheel angle sensor 50 is turned to more than 15° while the speed sensor indicates that the speed of the vehicle is less than 60 mph, the controller will illuminate the upper light source 32. As the speed sensor 48 indicates that the speed of the vehicle is reduced to below 40 mph, the lower light source 40 is illuminated in combination with the upper light source 32 to provide maximum width static bending light.

Figure 4:
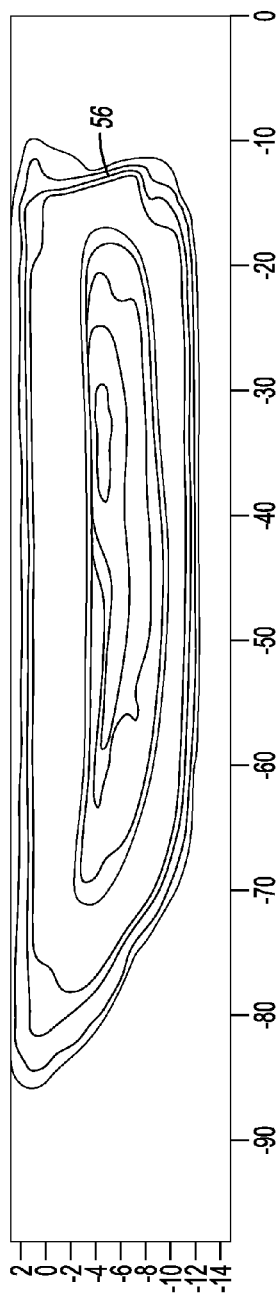
FIG. 4 is a light projection diagram for a first stage static bending light made according to the system of FIG. 1.

Referring to FIG. 4, a first stage light projection pattern 56 is illustrated that illustrates the light pattern created by the upper static bending light 20.

Figure 5:
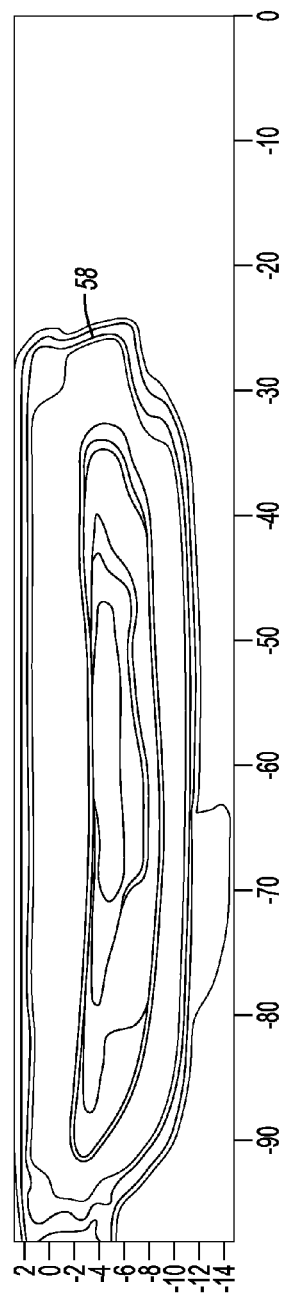
FIG. 5 is a light projection diagram for a second stage static bending light made according to the system of FIG. 1.

Referring to FIG. 5, a second stage light projection pattern 58 is shown that illustrates the light projection pattern created by the lower static bending light 22 when illuminated.

Figure 6:
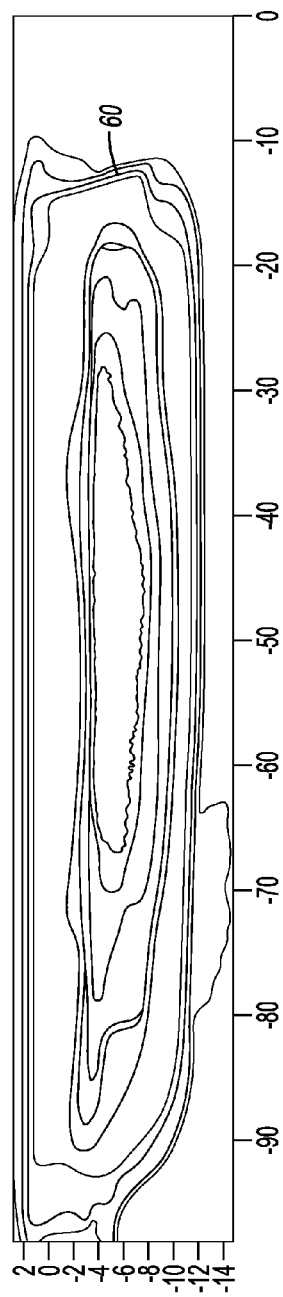
FIG. 6 is a combined light projection diagram for the first stage and the second stage static bending lights and made according to the system of FIG. 1.

Referring to FIG. 6, a combined first and second stage light projection pattern 60 is illustrated that shows the combined light projection pattern for both the upper static bending light 20 and the lower static bending light 22.

Depending largely upon the speed of the vehicle and the radius of the turn being made by the vehicle, either the first stage light projection pattern 56 or the combined first and second stage light projection pattern 60 will be provided by the static bending light system. The first stage light projection pattern 56 is contiguous with and continues the light projection pattern of the low-beam headlights 16 to a point approaching 80° from the longitudinal centerline of the vehicle. The second stage light projection pattern 58 blends with the light projection pattern of the first stage light projection pattern 56 and continues the lighting of the static bending system to approximately 90° relative to the longitudinal centerline of the vehicle. When the two stage light projection patterns are both illuminated, a continuous light projection pattern is provided from about 15° from the longitudinal centerline of the vehicle to 90° from the longitudinal centerline of the vehicle.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A light assembly on a first side of a vehicle comprising:
   a low-beam headlight;
   a high-beam headlight;
   a housing having an inboard wall that defines an opening that is disposed between a longitudinal center of the vehicle and in front of the headlights, the inboard wall facing the first side; and
   upper and lower static light sources projecting through the opening that are independently controlled to illuminate different areas of the first side.

2. The light assembly of claim 1 wherein the upper and lower static light sources further comprise:
   a reflector assembly.

3. The light assembly of claim 2 further comprising:
   a turn signal actuator;
   a speed sensor;
   a steering direction sensor; and
   a controller that receives a signal from the turn signal actuator when actuated, the speed sensor when a sensed vehicle speed is within a defined range, and from the steering direction sensor when the vehicle is turned toward the first side.

4. The light assembly of claim 3 wherein the steering direction sensor is a steering wheel position sensor.

5. The light assembly of claim 1 wherein the upper light source illuminates a forward area of the first side adjacent an area illuminated by the low beam headlight, and the lower light source illuminates a rear area of the first side that is rearward of the forward area.

6. A headlight assembly of a vehicle comprising:
one or more headlamps projecting light in front of the vehicle;
a longitudinally extending wall defining a lens opening, wherein the lens opening is disposed inboard of and in front of the one or more headlamps;
an upper light source and reflector assembly secured to the wall; and
a lower light source and reflector assembly secured to the wall below the upper light source, wherein the upper light source and lower light source are independently controlled to illuminate different portions of the first side and project light toward a first side through the lens opening.

7. The headlight assembly of claim 6 wherein the upper light source illuminates a forward portion of the first side adjacent an area illuminated by a low beam headlight, and the lower light source illuminates a lateral portion of the first side adjacent the forward portion on an opposite side of the forward portion from an area illuminated by the low beam headlight.

8. The headlight assembly of claim 6 in combination with a vehicle, further comprising:
a turn signal actuator;
a speed sensor;
a steering direction sensor; and
a controller that receives a signal from the turn signal actuator when actuated, the speed sensor when a vehicle speed is within a defined range, and from the steering direction sensor when the vehicle is turned toward the first side.

9. The headlight assembly of claim 8 wherein the steering direction sensor is a steering wheel position sensor.

10. The headlight assembly of claim 6 wherein the wall is disposed on an inboard end of the headlight assembly that is closest to a longitudinal centerline of the vehicle.

11. A headlight assembly for a vehicle comprising:
a housing having a inboard wall that defines a lens opening and is disposed between a longitudinal center of the vehicle and the headlight assembly, the inboard wall facing a first side of the vehicle;
a plurality of low-beam modules attached to the housing;
a plurality of high-beam modules attached to the housing; and
a static light provided on the inboard wall and in front of the low-beam modules and the high-beam modules that selectively illuminates the first side through the lens opening
wherein the upper light source and lower light source are independently controlled to illuminate different portions the first side.

12. The headlight assembly of claim 11 wherein the static light further comprises:
an upper light source and reflector assembly; and
a lower light source and reflector assembly.

13. The headlight assembly of claim 12 in combination with a vehicle further comprising:
a turn signal actuator;
a speed sensor;
a steering direction sensor; and
a controller that receives signals from the turn signal actuator when actuated, from the speed sensor when a vehicle speed is within a defined range, and from the steering direction sensor when the vehicle is turned toward the first side, and wherein the upper light source and lower light source are actuated independently to illuminate different portions the first side.

14. The headlight assembly of claim 13 wherein the steering direction sensor is a steering wheel position sensor.

15. The headlight assembly of claim 11 wherein the upper light source illuminates a forward portion of the first side adjacent an area illuminated by the low beam module, and the lower light source illuminates a lateral portion of the first side adjacent the forward portion on an opposite side of the forward portion from the area illuminated by the low beam module.

* * * * *